United States Patent [19]

Pratap

[11] 4,239,186
[45] Dec. 16, 1980

[54] TRIP VALVE CONSTRUCTION

[75] Inventor: Prem Pratap, Pittsburgh, Pa.

[73] Assignee: Carrier Corporation, Syracuse, N.Y.

[21] Appl. No.: 31,233

[22] Filed: Apr. 18, 1979

[51] Int. Cl.³ .................................. F16K 31/524
[52] U.S. Cl. ..................................... 251/255
[58] Field of Search ............... 251/252, 253, 254, 255, 251/245; 74/104, 107, 567

[56] References Cited

U.S. PATENT DOCUMENTS

| | | | |
|---|---|---|---|
| 275,099 | 4/1883 | Walker | 251/254 |
| 1,580,681 | 4/1926 | Saksa | 251/253 |
| 1,740,602 | 12/1929 | Keeler | 251/254 |
| 2,603,445 | 7/1952 | Marchant | 251/255 |

FOREIGN PATENT DOCUMENTS

| | | | |
|---|---|---|---|
| 856085 | 7/1949 | Fed. Rep. of Germany | 251/253 |
| 1386839 | 3/1964 | France | 251/253 |

*Primary Examiner*—Martin P. Schwadron
*Assistant Examiner*—A. Michael Chambers
*Attorney, Agent, or Firm*—J. Raymond Curtin; Donald F. Daley

[57] ABSTRACT

A trip valve including a valve body provided with a valve seat and further including a movable trip lever having a cam defining a first support surface thereof. A valve stem is movably disposed within the valve body and includes a valve attached to one end thereof for movement between a closed seat engaged position and an open seat disengaged position. A trip pin is attached to the valve stem and is movable therewith. The trip pin is supported upon the first support surface of the trip lever. A force generating device is operably connected to the valve stem for urging the valve into its seat engaged position. The cam includes a first portion movable between a first position spaced from the trip pin and a second position whereat the trip pin is directly supported upon the first portion of the cam. The first portion of the cam provides a force for urging the valve into its open seat disengaged position.

3 Claims, 4 Drawing Figures ent position.

TRIP VALVE CONSTRUCTION

DESCRIPTION

BACKGROUND OF THE INVENTION

This invention relates to a trip valve for use in rapidly terminating the flow of motivating fluid to the rotor of a turbomachine.

Turbomachines, such as steam driven turbines, almost universally employ a trip valve for rapidly terminating the flow of motivating fluid to the turbomachine. It is desirable that the trip valve be capable of almost instantaneous closing under certain circumstances, such as turbine overspeed conditions, to prevent damage to the turbomachine or the equipment being driven thereby.

Very often the trip valves of the prior art have been relatively expensive to manufacture and have not always functioned as required in instantaneously terminating the flow of the motivating fluid. For example, many of such prior art trip devices have included relatively complex mechanical arrangements such as linkages or similar apparatus. The instantaneous closing of the trip valves have not always been accomplished due to the frictional forces generated within the mechanical arrangements which had to be overridden before the valve could actually be closed.

SUMMARY OF THE INVENTION

Accordingly, it is an object of this invention to improve trip valve devices.

It is a further object of this invention to provide a trip valve which is a relatively economical structure for manufacturing.

It is yet another object of this invention to provide a trip valve utilizing a minimum number of complex mechanisms for achieving substantially instantaneous closing thereof.

These and other objects of the present invention are attained in a trip valve including a valve body provided with a valve seat and further including a movable trip lever having cam means defining a first support surface thereof. A valve stem is movably disposed within the valve body and includes a valve attached to one end thereof for movement between a closed seat engaged position and an open seat disengaged position. A trip pin is attached to the valve stem and is movable therewith. The trip pin is supported upon the first support surface of the trip lever. Force generating means are operatively connected to the valve stem for urging the valve into its seat engaged position. The cam means include a first portion movable between a first position spaced from the trip pin and a second position whereat the trip pin is directly supported upon the first portion of the cam means. The first portion of the cam means provides a force for urging the valve into its open seat disengaged position.

DESCRIPTION OF THE PREFERRED EMBODIMENT

Figure 1:
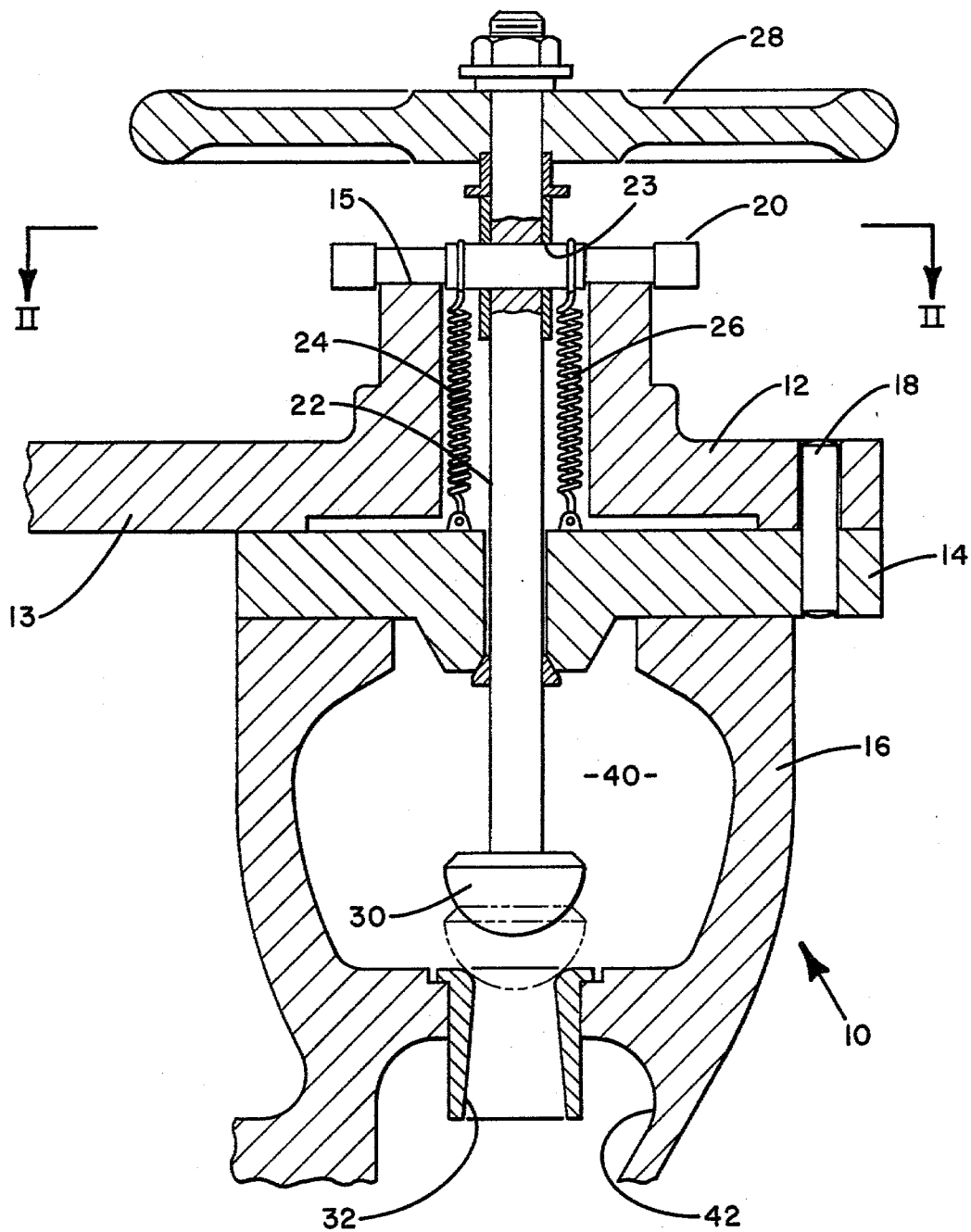
FIG. 1 is a longitudinal sectional view of a trip valve in accordance with the present invention.

Referring now to the drawings, there is disclosed a preferred embodiment of the present invention. In referring to the various figures of the drawings, like numerals shall refer to like parts.

Figure 2:
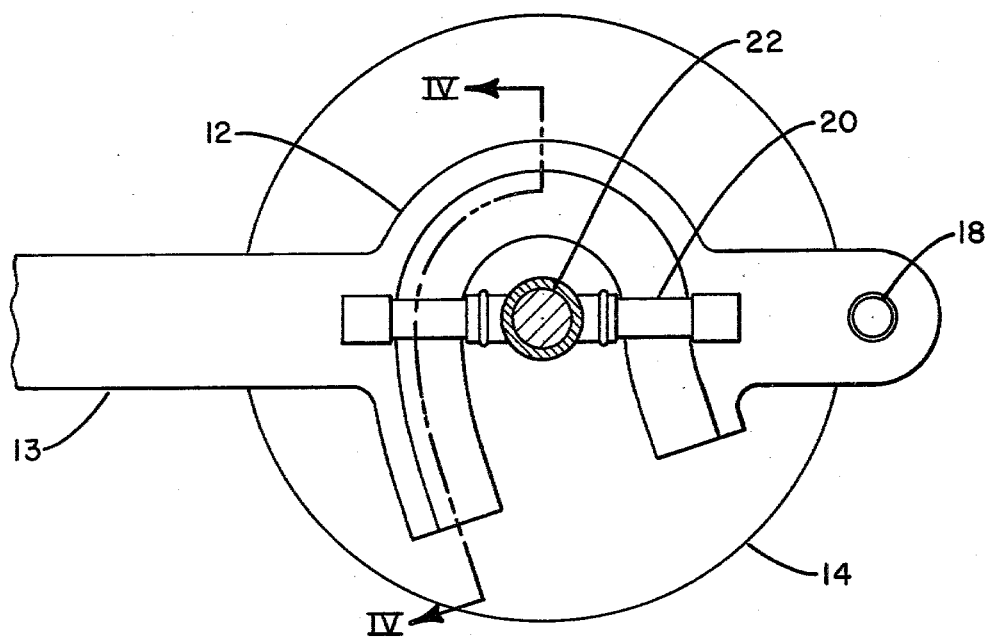
FIG. 2 is a sectional view taken along the line II—II of FIG. 1 illustrating the valve with elements thereof in a first operating position.
Figure 3:
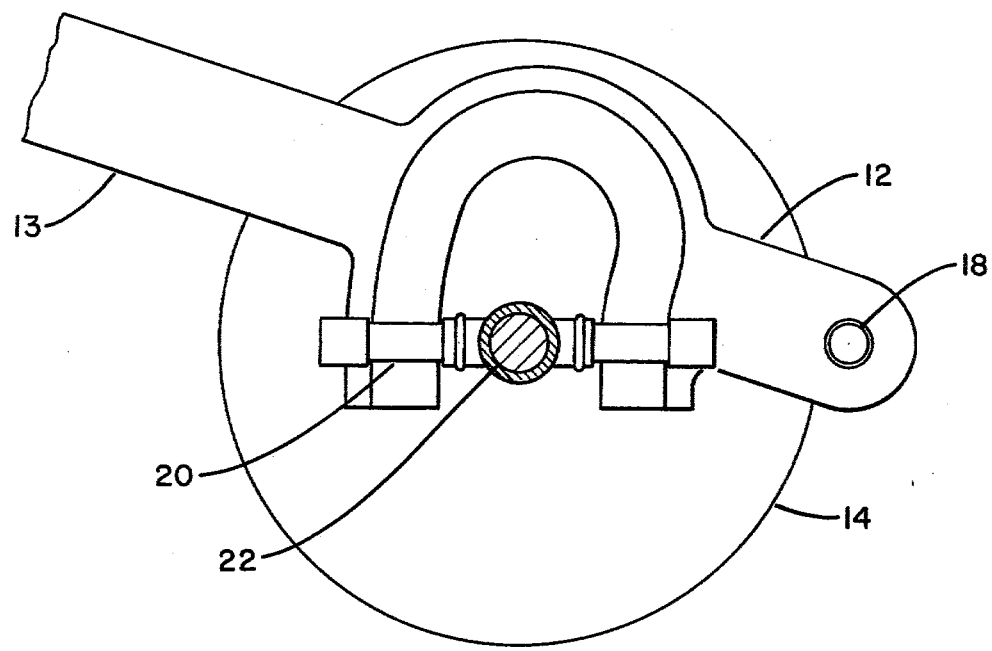
FIG. 3 is a view similar to FIG. 2 illustrating the elements of the valve in a second operating position.

Referring particularly to FIG. 1, there is disclosed a longitudinal sectional view of a trip valve 10 designed in accordance with the present invention. Trip valve 10 includes a valve body including a generally U-shaped trip lever 12 (see FIGS. 2 and 3). Trip lever 12 includes a generally horizontally extending extension 13. The function of extension 13 shall be more fully explained hereinafter. The valve body of trip valve 10 further includes a valve cover 14 and a valve bonnet 16. Although the valve cover and bonnet are shown as manufactured from two separate pieces of material it is within the scope of the invention to form these two elements from a single piece of material wherein in essence the valve cover will be merged with the valve bonnet. Trip lever 12 overlies valve cover 14 and valve bonnet 16, and is movably connected to the valve cover 14 through pin 18. A valve seat 32 is formed in valve bonnet 16.

Figure 4:
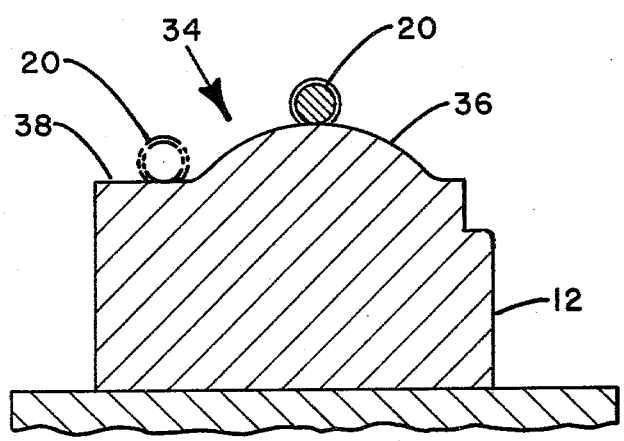
FIG. 4 is a sectional view along the line IV—IV of FIG. 2 with a portion of one of the elements shown in phantom.

As shown more fully in FIG. 4, the top surface of trip lever 12 is defined by cam means 34. Cam means 34 includes a first portion 36 defined by a convex surface and a second portion 38 defined by a concave surface.

A trip pin 20 is supported upon the top or support surface 15 of trip lever 12. Trip pin 20 extends through a horizontal hole 23 formed in a valve stem 22 disposed within the valve body of trip valve 10. Hole 23 is formed generally adjacent to and vertically above support surface 15 for attaching trip pin 20 to valve stem 22 such that the trip pin is supported by support surface 15 of lever 12. Valve stem 12 terminates at one end thereof in a valve 30. The upward longitudinal movement of the valve stem within the valve body brings valve 30 into an open seat disengaged position as shown in full lines in FIG. 1 and a downward longitudinal movement of the valve stem brings valve 30 into a closed seat engaged position as shown in phantom in FIG. 1.

Force generating means, such as tension springs 24 and 26 are suitably attached to the valve stem to urge the valve stem towards the seat engaged position. In the present embodiment, springs 24 and 26 are secured at one end thereof to trip pin 20 and at the other end thereof to a non-movable portion of the valve, as for example valve cover 14 or valve bonnet 16. Springs 24 and 26 urge the trip pin 20, and thus the valve stem 22 to which the trip pin is connected, downwardly to place valve means 30 in engagement with valve seat 32. Handle 28 is provided for manually placing the valve 30 in its seat disengaged position. As shown in FIG. 4, valve stem 22 is moved upwardly within the valve body by placing convex surface 36 of cam means 34 in direct contact with trip pin 20. By supporting the pin directly on convex surface 36, the force generated by springs 24 and 26 is overridden, thereby moving the valve stem upwardly within the valve body.

Similarly, to close the valve, lever 12 is moved relative to pin 20 to place concave surface 38 into contact with the pin, thereby enabling the force generated by springs 24 and 26 to move the valve into its seat engaged position shown in phantom in FIG. 1. The position of pin 20 relative to concave surface 38 when valve 30 is closed is illustrated in FIG. 4 in phantom.

Valve 10 is generally employed with a turbomachine, such as a steam turbine, for immediately terminating the flow of a motivating fluid, such as steam to the turbomachine. The valve includes an inlet chamber 40 for receiving the motivating fluid from a source thereof. Outlet chamber 42 is provided downstream of seat 32. Thus valve means 30 in cooperation with seat 32, controls the flow of fluid from chamber 40 to chamber 42. With the valve 30 shown in the solid position of FIG. 1, the motivating fluid can pass through valve seat 32 to the outlet 42 of the valve and thence to the rotor portion of the turbomachine. When it is desired to terminate the flow of fluid from inlet chamber 40 to outlet 42, valve means 30 is placed in its closed seat engaged position.

Extension 13 is in contact with the trip mechanism of the turbomachine. The trip mechanism is activated upon the occurrence of an undesirable operating condition of the turbomachine, as for example overspeed conditions. Various types of trip mechanisms, such as centrifugal force sensitive devices are well known to those skilled in the art and the illustration and explanation of their operation is not deemed necessary.

Upon the occurrence of the overspeed or other undesirable operating condition, trip lever 12 is rotated in a horizontal plane about pin 18, placing concave surface 38 in supporting relationship relative to pin 20. The trip pin and thus valve stem 22 attached thereto are moved downwardly with respect to the valve bonnet due to the forces generated by springs 24 and 26. Valve 30 is thus moved into its closed seat engaged position.

When it is desired to institute flow of fluid to the turbomachine, lever 12 is rotated to bring convex surface 36 of cam means 34 into supporting relationship relative to pin 20. The convex surface physically urges the valve stem and pin upwardly relative to valve bonnet 16, thereby opening valve 30.

The present invention provides a relatively inexpensive and non-complex trip valve, yet one which effectively operates to terminate flow of motivating fluid as required.

While a preferred embodiment of the present invention has been described and illustrated, the invention should not be limited thereto, but may be otherwise embodied within the scope of the following claims.

I claim:

1. A trip valve comprising:

a valve body including a valve bonnet having a valve seat and a trip lever having a cam-like surface formed at the top thereof, said trip lever overlying the valve bonnet and being joined thereto for permitting movement of the lever relative to the bonnet;

a valve stem movably disposed within the valve body and only movable in a linear path and including a horizontally extending hole formed substantially adjacent to and vertically above the cam-like surface of the trip lever, and valve means formed at the other end thereof and only linearly movable between seat disengaged and seat engaged positions with respect to the valve seat in accordance with movement of the valve stem;

a trip pin passing through the hole formed in the valve stem and supported upon the cam-like surface of the trip lever;

force generating means for urging the valve stem into closed seat engaged position, with a first portion of the cam-like surface of the trip lever generating a force in opposition to the force generated by said force generating means for urging the valve stem and valve means into the open seat disengaged position, said cam-like surface being movable relative to the trip pin through the movement of the trip lever for moving said valve means between said seat disengaged and seat engaged positions; and said force generating means including a pair of tension springs, with one end of each spring attached to the trip pin and the other end attached to a non-movable portion of the trip valve, with the springs urging the valve stem through attachment to the trip pin towards the seat engaged position of the valve means.

2. A trip valve in accordance with claim 1 wherein the non-movable portion of the trip valve is the valve bonnet.

3. A trip valve in accordance with claim 1 wherein said cam-like surface includes at least one generally convex portion and one generally concave portion, with movement of said trip lever relative to said trip pin resulting in said pin being supported upon said convex surface for placing said valve means in its seat disengaged position and being supported upon said concave surface for placing said valve means in its seat engaged position.

* * * * *